United States Patent [19]

Gregor et al.

[11] Patent Number: 5,312,873
[45] Date of Patent: May 17, 1994

[54] SURFACE TREATMENTS TO IMPART HYDROPHILICITY

[75] Inventors: Harry P. Gregor, 410 Riverside Dr., New York, N.Y. 10025; Alexander Burshteyn, Flushing, N.Y.; Leonard T. Hodgins, Closter, N.J.; John Kassotis, Astoria; Edgar Samuelson, Brooklyn, both of N.Y.

[73] Assignee: Harry P. Gregor, New York, N.Y.

[21] Appl. No.: 711,673

[22] Filed: Jun. 6, 1991

Related U.S. Application Data

[60] Division of Ser. No. 635,421, Jan. 3, 1991, Pat. No. 5,059,659, which is a continuation of Ser. No. 55,667, May 29, 1987, abandoned.

[51] Int. Cl.$^5$ ............................................. C08F 8/04
[52] U.S. Cl. ........................... 525/348; 525/329.1; 525/329.2; 525/329.3; 525/386; 525/387
[58] Field of Search .................. 525/348, 386, 387

[56] References Cited

U.S. PATENT DOCUMENTS

| | | | |
|---|---|---|---|
| 4,108,802 | 8/1978 | Wright | 525/328.2 |
| 4,143,203 | 3/1974 | Rigopulos et al. | 525/329.1 |
| 4,954,566 | 9/1990 | Gowan, Jr. | 525/386 |

Primary Examiner—Bernard Lipman
Attorney, Agent, or Firm—Sprung Horn Kramer & Woods

[57] ABSTRACT

Water insoluble polymers are treated to place on their exposed surfaces the pendant alkyl imidocarbonyl (amide) groups to impart a high degree of hydrophilicity to that surface. Nitrile-containing polymers or copolymers in the form of insoluble films, filters or membranes are treated to convert a substantial fraction of the surface nitrile groups into the corresponding amide by the use of hydrogen peroxide or concentrated acids. The surface is rendered hydrophilic and resistant to fouling to the extent that even proteins are not denatured thereupon. The surface may also be converted to substituted amides by subsequent reactions to impart to it other functionalities or to serve as the basis for coupling reactions. Other polymers capable of surface treatment to produce pendant amidocarbonyl groups include ones containing pendant esters which on cleavage of the oxygen-carbon bond give pendant alcohol groups. These are converted by cyanoethylation to form the pendant nitrile groups which can be converted to the amide. Other polymers which on hydrolysis give pendant carboxylic acids can be treated with ammonia to also produce pendant amide groups.

2 Claims, 3 Drawing Sheets

FIG. 1 REJECTION OF SERUM ALBUMIN AND GAMMA GLOBULINS THROUGH DIAFLO YM 100

FIG. 2 REJECTION OF SERUM ALBUMIN AND GAMMA GLOBULINS THROUGH A POLYACRYLONITRILE-H-200 MEMBRANE

FIG. 3 REJECTION OF SERUM ALBUMIN AND LYSOZYME THROUGH A PM 30 MEMBRANE

FIG. 4 REJECTION OF SERUM ALBUMIN AND LYSOZYME THROUGH A POLYACRYLONITRILE-H-50 MEMBRANE

FIG. 5 REJECTION OF GAMMA GLOBULINS AND LYSOZYME THROUGH DIAFLO YM100

FIG. 6 REJECTION OF GAMMA GLOBULINS AND LYSOZYME THROUGH A POLYACRYLONITRILE-H-200

SURFACE TREATMENTS TO IMPART HYDROPHILICITY

This is a division of application Ser. No. 635,421, filed Jan. 3, 1991, now U.S. Pat. No. 5,059,659, which is a continuation of Ser. No. 055,667 filed May 29, 1987, now abandoned.

BACKGROUND OF THE INVENTION

The present invention relates to novel polymeric materials from insoluble polymers originally containing the pendant nitrile group, the conversion of a substantial fraction of the surface groups to amides, the further conversion of surface amides to substituted amides, and the uses of these materials, and also to insoluble polymers containing pendant ester groups which by other reaction sequences produce pendant amide groups on their surfaces.

The known methods for the treatment of polymeric surfaces, fibers, membranes and the like to impart to them hydrophilicity or a high degree of water-wetability have involved reactions much as the hydrolysis of esters to alcohols and acids by bond cleavage, and also the sulfonation of olefinic, aromatic and other polymers to place sulfonic acid groups on the surface. The surface groups responsible for hydrophilicity have been ionic or polar in character. The grafting of polar monomers onto the surface of water-insoluble polymers to render the surface hydrophilic is also well known. These surface treatments can render the surface polymer chains partly water-soluble, or the polymer itself is converted to a gel-like form and partially solubilized by such treatment, or long hydrophilic chains extend into the water and make for undesirable properties in the formed product.

Particularly desirable, very strongly hydrophilic polymers are those which have an extensive fraction of their surface groups as pendant amides not joined to an aromatic ring. The strongly hydrophilic and useful polymer polyacrylamide and its ionic derivatives are examples; a recent patent by Gregor et al. (U.S. Pat. No. 45,596,858, Jun. 24, 1984) and a co-pending CIP describe the insolubilization of polymers containing the pendant aminocarbonyl and other groupings. These water-soluble polymers were then insolubilized by a novel cross-linking reaction so that they could be made in the forms of films, filters, membranes and the like.

In the present invention water-insoluble polymers are treated on their superficial and pore surfaces to place substantial amounts of pendant amides thereupon. Water-insoluble film-forming polymers containing the nitrile group such as polyacrylonitrile (PAN) are treated to convert a substantial fraction of their surface nitrile groups to the amide in a reaction which does not alter the morphology and other properties of the polymer appreciably but does render it strongly hydrophilic. The reactivity of the amide moiety is such that derivatives can be made to impart to the surface other, desirable properties. The present invention provides for a surface treatment which is unique in the extent and hydrophilicity of the final product, its practicality of application and the wide range of applications which result. These surface reactions are believed to proceed by the partial hydrolysis of the nitrile groups by the use of either alkaline hydrogen peroxide or the use of a strong acid as by mixtures of sulfuric acid with other materials to produce substantial amounts of the amide group. The reaction which employs hydrogen peroxide makes use of a reducing agent which eliminates the production of oxygen and subsequent blistering to make for a strongly hydrophilic surface which retains the essential physical properties and structure of the original material.

The novel surface treatment techniques taught by this invention produce microfiltration and ultrafiltrations membranes and the like with surfaces which do not become readily fouled or denature proteins. Typical microfilters and ultrafilters are cast from or formed from water-insoluble polymers which are usually rigid and physically strong but are hydrophobic and are readily fouled by the adsorption of hydrophobic particles and solutes from feed streams. Such fouling is a major problem in the industrial use of membranes and filters leading to low rates of throughput and making frequent cleansing or costly pretreatment necessary. Materials produced by the selective surface treatment of nitrile-containing and other polymers as taught by this invention have been shown to resist such adsorptive fouling while retaining their insolubility in water and their useful physical characteristics, including their porosity.

The teachings of this invention are applicable to the preparation of many different kinds of materials. For example, it has been found that surfaces which are relatively smooth (on a molecular level) and formed by the dissolusion and complete drying of a water-insoluble polymer such as PAN or from PAN fibers, are converted relatively slowly into hydrophilic materials by the surface treatments described herein. On the other hand, the same surface treatments applied to polymers which have been coagulated from solution, where the surface area is quite large (per macroscopic unit area of membrane) and where the porous surface is quite rough are made hydrophilic rapidly. The materials which can be rendered useful by the surface treatments include screens, microfilters and ultrafilters, all of which retain the high physical strength of the base polymer.

SUMMARY OF THE INVENTION

In accordance with the present invention, we have found that substantially improved surfaces, fibers, microfilters, ultrafilters and the like, all of which resist fouling and are strongly hydrophilic can be prepared by the surface treatment of a water insoluble core polymer to impart pendant amide groups. A linear polymer or copolymer containing pendant nitrile groups has been surface-treated by a procedure which involves the use of hydrogen peroxide or other peroxides, usually combined with a soluble reducing agent to avoid the deleterious presence of oxygen bubbles. Treatment with concentrated acids such as sulfuric acids in certain composition ranges and mixtures or other acids such as sulfonic acids can accomplish the same purpose. The advantage of the peroxide treatment is that the reaction does not proceed to form the carboxylic acid group, something which makes for disadvantages due to its reactivity with di- and polyvalent cations in solution. Polymers containing pendant ester groups joined via the carbonyl or oxycarbonyl links can similarly be surface treated to produce pendant amide groups. This invention allows one to make membranes, films and filters and the like from solid polymers of excellent mechanical strength, with a controlled pore size where desirable, and of a high degree of surface hydrophilicity. The surface group is also capable of being converted into other desirable functionalities.

DETAILED DESCRIPTION OF THE INVENTION

This invention describes a means of treating insoluble core polymers containing the pendant nitrile and ester groups such that an appreciable part if not a majority of the surface nitrile groups are converted into the corresponding amides.

The background of this invention is to be found in part in the early observation of Radziszewski (BER, 17, 1389 (1884)) on the hydrolysis of organic nitriles by alkaline hydrogen peroxide. This reaction was further investigated by Wiberg (J.Am.Chem.Soc. 75, 3961 (1953)) who studied the rate and possible mechanisms of the reaction and by Payne, Deming and Williams (J. Org. Chem. 26, 659 (1961)), which led to the postulate that the reaction took place by a mechanism which involved the epoxidation of a nitrile. The reaction appeared to proceed in two steps at pH 8, first by the formation of an intermediate which may be peroxycarboximidic acid as shown below, which then reacts with a reductant to give the amide and the oxidized form of the reducing agent. Payne showed that hydrogen peroxide acted as a reductant if used alone, but other reducing agents including olefins could produce the same final product (the amide) in a reaction which eliminated the production of oxygen. All of the work of Radziszewski, Wiberg and Payne and coworkers were limited to reactions in solutions of low molecular weight nitriles. No work has been reported on polymeric nitriles in solution, nitriles in the solid state or on the surface of a polymer.

$RCN + H_2O_2 = RC(NH)OOH + H_2O_2 = RCONH_2 + O_2 + H_2O$

Many studies have been carried out to convert an insoluble surface or an insoluble, porous membrane which is normally hydrophobic into objects with a surface which is hydrophilic. Hydrophilicity is commonly measured by wetability in aqueous solution. Water drains quickly from the surface of hydrophobic membranes, leaving them quite dry. It is known that surfaces or membranes of polyacrylonitrile (PAN) can be rendered hydrophilic by strong acid or strong base hydrolysis to convert the nitrile into the corresponding acid. Similarly, surfaces or membranes of PAN can be subject to monomers and polymerization initiators such that hydrophilic polymers are grafted onto such surfaces to render them hydrophilic. All of these techniques are well known.

The search for a hydrophillic surface or a porous membrane which is also hydrophilic has been the object of considerable effort and study because of the general phenomenon of surface fouling. This involves the adhesion or sorption to a surface of substances present in water, as a typical fluid. Typically, this occurs when proteins are present in solution; their attachment to hydrophobic surfaces as well as to ones which are water-wetted such as glass, containing the alcohol, carboxylic acid and similar groupings are well documented in the literature.

Homopolymers and copolymers of acrylonitrile have been studied extensively as coatings and as membrane-forming materials for a number of applications. As coatings these polymers are unusually dense, have excellent mechanical properties and have an unusually low transmission to molecular oxygen. In the form of membranes these polymers can be cast from solvents such as dimethylformamide (DMF) and then coagulated by nonsolvents such as water so as to form firm and relatively hard materials of fixed pore structure. An additional advantage of homopolymers and copolymers of acrylonitrile is that once such porous membranes have been formed by coagulation in a nonsolvent, they can then be dried in air and still retain a substantial fraction of their original porosity as measured by hydraulic permeablility in water. Many other membrane-forming polymers such as cellulose acetate do not have this property and therefore suffer by comparison.

While surfaces and membranes of polyacrylonitrile or acrylonitrile copolymers can be rendered hydrophilic by hydrolysis to the corresponding carboxylic acids, the product is of limited application. As an example, when dissolved or suspended substances containing a carboxylic group (as is often the case) are present along with divalent ions such as calcium, surface fouling takes place through the formation of ionic bridges. Grafting of hydrophilic polymers onto PAN, even ones of non-carboxylic nature, produces polymer chains which extend into the solution and into pores and impart a poor hydraulic permeability to fine pore membranes or foul by entanglement. It is for these reasons that it is desirable to be able to surface-treat polymers of PAN or nitrile-containing polymers or copolymers to be able to impart to the surface a strongly hydrophilic character (one which is uncharged is often the most desirable), with a degree of conversion controlled so as not to render the substructure of the polymer itself hydrophilic and therefore susceptible to swelling or dissolution ian water. The higher the degree of surface substitution by hydrophilic groups, generally the more fouling-resistant is the product. For a more detailed description of the nature and degree of hydrophilicity desired for a number of applications, the patents of Gregor et. al. (U.S. Pat. No. 4,596,858, Jan. 24, 1986) and of a co-pending CIP of that patent can be consulted.

We have employed the Radziszewski reaction on uncoagulated or coagulated films of PAN employing different concentrations of hydrogen peroxide in a buffer of pH 8–9. It was found that the Radziszewski reaction did proceed with the polymeric nitrile to provide a surface or a membrane which was hydrophilic. When the concentration of hydrogen peroxide was 5% or greater the surface became hydrophilic in a relatively short period of time (an obvious, practical advantage) when the reaction took place on coagulated PAN, but these membranes which had been cast onto a porous support blistered and lifted from the fabric. It was surmised that delamination took place preferentially where the membrane joined the support. When the concentration of hydrogen peroxide was reduced to 1% the reaction required four or more hours, with the surface becoming hydrophilic with a minimum of blistering.

At this point the teachings of Payne were employed to avoid the secondary reaction with peroxide which produces oxygen. Payne investigated the use of several reactive reducing reagents which included olefins such as cyclohexene, aniline, pyridine and the like. Under these circumstances the nitrile reacted with one mole of hydrogen peroxide to form the intermediate which in the presence of an olefin (as an example) formed two products, the amide and an epoxide of the olefin. The oxidized form of aniline was believed to be azoxybenzene and of pyridine the N-oxide.

Since this invention describes the treatment of a water-insoluble surfaces or membranes, it is strongly preferred that a water soluble reducing agent be used, preferably one which is also non-toxic. One olefinic reducing agent that appeared to be particularly suitable is fumaric acid as the disodium salt. A substituted water soluble pyridine, namely 3-pyridylhydroxymethane sulfonic acid (PHMS) was also studied. It is obvious that a wide range of reducing agents can serve the purpose; given the practical considerations which obtain, water soluble olefinic compounds of which fumaric acid is a typical example have obvious advantages.

A number of different formulations were developed and tested. A membrane was cast from a polymer of PAN having a molecular weight of 150,000 from DMF onto a commercial spun-bonded olefinic support (DuPont Typar). The casting solution was 12–14% (by weight) and the gate casting blade opening was 7 mils. The freshly cast film was coagulated in ice water to yield a membrane having a pure water flux which varied from 1 to 10 microns per sec-atm. This was treated with 1% hydrogen peroxide in a pH 9 buffer using sodium borate (0.1M) with added sodium hydroxide to adjust the pH, at 50° C. for four hours. A hydrophilic surface was produced but there was a small amount of blistering. That this was a surface reaction was indicated by the small change in the flux of the treated membrane compared to the original, untreated one.

The above procedure was repeated with added 0.5–0.1M EDTA with the pH again adjusted to 9. This agent acts to complex traces of metals known to catalyze the decomposition of hydrogen peroxide to oxygen. Le3s bubbles were formed, there was little blistering but the reaction required about four hours.

When 5% hydrogen peroxide was employed at 50° C. using the pH 9 buffer the process took place quickly; in about 15 minutes the membrane appeared hydrophilic but blisters were formed. The addition of EDTA reduced the amount of blistering but some still remained to a deleterious extent.

Then 1% hydrogen peroxide (0.3M) in the pH 9 borate buffer at 50° C. and containing 0.05 M EDTA was used, with the solution also 0.3M in fumaric-c acid, with the pH adjusted to 9 before use before use. Now no bubbles were formed in the solution nor was any blistering observed. Moreover, the surface became hydrophilic in 30 minutes, as opposed to a 4 hour reaction time in the absence of the olefinic reducing agent.

When the process was repeated using 5% hydrogen peroxide (instead of 1%) but with all of the other components including EDTA and fumaric acid present, there were no blisters or bubble formation evident and the membrane became hydrophilic in 15 minutes. The use of PHMS was examined but it had virtually no effect in preventing oxygen formation or reducing blistering.

Various modifications of the Payne reaction make for a rapid and possibly more uniform conversion of the surface nitrile groups to the corresponding amides. The use of 50% methanol and 50% DMF (by volume) in place of water was examined. Some of the buffer salts were not entirely soluble in 50% methanol. When the reaction was performed under the latter conditions (5% peroxide with fumarate), no enhancement of the rate or extent of hydrophilization appeared. If anything, hydrophilization appeared to take a somewhat longer period of time. On the other hand, when 50% DMF was employed, the hydrophilization reaction took place more quickly, in about 5–10 min. The substitution of non-aqueous solvent may have acted to displace water and facilitate peroxide attack of the surface nitrile groups.

The nature of the polymer and the character of its surface also influence the degree of hydrophilicity attained. For example, when a homopolymer of PAN is cast onto a surface and allowed to dry completely without coagulation, the hydrophilization reaction proceeds quite slowly and several hours of treatment are required to render the surface hydrophilic. It may be assumed that the total exposed surface on a molecular level per unit area (measured macroscopically) is minimal under these circumstances, with most of the nitrile groups sterically hindered and not readily available to attack by hydrogen peroxide. On the other hand, when the same polymer is dissolved in a solvent, cast and then immediately coagulated by immersion in a non-solvent such as water, a highly irregular surface of sponge-like character is attained, as is well known. Such surfaces are rapidly hydrophilized by the reaction with peroxide and fumaric acid because the nitrile groups are undoubtedly much more exposed.

A number of nitrile-containing polymers and copolymers are available. A common nitrile homopolymer is that of acrylonitrile, available commercially from various sources. The one most used in our studies was a DuPont product (Type A, homopolymer of molecular weight 150,000). The monomer acrylonitrile readily copolymerizes with a number of different monomers including methylmethacrylate, vinyl chloride and a number of other substances to form a wide range of copolymers.

A number of other unsaturated nitriles could be employed for the purposes at hand. Among these are 2-methyl-2-butenenitrile and 2-methyl-3-butenenitrile polymers wherein the nitrile group is separated by methylene groups from the backbone chain and are expected to be more susceptible to attack by the peroxide. On the other hand, polymers which have a bulky side chain are not, as a rule, good film-formers compared to ones with compact polymer chains such as PAN. It is obvious to one skilled in the art that the proper balance between ease and extent of hydrophilization and film forming characteristics will govern the monomer of choice for a particular application.

The extent of conversion of nitriles to amides on a surface or membrane was determined by reaction with ethylenediamine (EDA) followed by ninhydrin assay, because amide groups in the presence of dioxane react with EDA, resulting in soluble products which show a positive reaction to ninhydrin.

The procedure followed was to prepare porous membranes and then subject them to the hydrophilization reaction. Following this, samples of the membrane were placed into dioxane changed several times to remove water, then placed into 1.5M EDA in dioxane at 80°–90° C. The reaction proceeds slowly at room temperature. PAN membranes which had not been hydrophilized served as blanks. Samples of hydrophilized membranes were kept in the EDA bath for varying periods of time, washed thoroughly with repeated changes of dioxane to remove EDA residues, then rinsed repeatedly with 0.1M acetic acid in dioxane, rinsed with distilled water, and finally placed in a vacuum oven overnight at room temperature prior to analysis.

The ninhydrin assay for amides was readily performed on unsupported membranes but not on ones cast onto polyester supports or other supports susceptible to dissolution in dioxane. A polyolefin support (DuPont Typar) was not dissolved by dioxane and served as an excellent support for these materials when subsequent treatment by EDA was employed.

In a typical reaction, a PAN membrane hydrophilized with peroxide-fumarate was treated with EDA in dioxane (1.5M and 90° C.). After one hour of treatment the ninhydrin assay showed that 90 nmoles (nanomoles) of EDA coupled per mg of membrane. After 3 hours of treatment 186 nmoles of EDA were coupled per mg. The amount of EDA coupled appeared to level off at about 2 or 3 hours of reaction time. After 6 hours 209 nmoles of EDA per mg of unsupported membrane were coupled.

The results of ninhydrin assays of EDA-treated PAN membranes which were not hydrophilized were as follows. After treatment at 90° C. for 4 hours by EDA, an unsupported PAN membrane (cast onto glass) yielded 23.2 nmoles of EDA per mg, and for a comparable Typar-supported membrane the assay was 33.6.

An entirely different process to convert surface nitrile groups to amides employed sulfuric acid and sulfonc acids under specific conditions. The reactions between polymeric nitriles in solution and sulphuric acid at different concentrations to produce amides and carboxylic groups are well known. However, the conversion of solid polymeric nitrile such as PAN predominantly to the amide has not been described in the literature.

It was found that concentrated sulphuric acid (95-98%) could effect the rapid hydrophilization of a coagulated PAN membrane, but the attack was so rapid that the membrane was largely destroyed. A film or surface of non-porous PAN (not coagulated) treated for 30 seconds with 95-98% sulphuric acid became highly hydrophilic. Times less than 30 seconds did not produce hydrophilicity, and times greater than 30 seconds produced a surface attack. That this surface was not converted to carboxylic acid groups but that an appreciable amount, if not largely amide groups were present was shown by subsequent treatment with EDA and ninhydrin assay; substantial amounts of surface amide groups were observed.

Sulphuric acid of lower concentrations (with water) rendered porous membranes hydrophilic but with an undesirable and rapid attack. With smooth (uncoagulated) films a 80:20 mixture of sulphuric acid: water produced a much slower reaction. Sulphuric acid mixed with dioxane was ineffective. While concentrated phosphoric acid could make the surface hydrophilic, the reaction took two hours. Organic sulfonic acids such as methane sulfonic acid could make uncoagulated membranes hydrophilic but the reaction was very rapid, taking 30 seconds or less and the necessary, subsequent dilution of this expensive agent makes that process less desirable. Inexpensive and simple reagents are obviously to be preferred.

Hydrophilization of coagulated PAN surfaces or membranes could also be achieved by treatment with mixtures of sulfuric and glacial acetic acids. A supported membrane treated by a 50% (by volume) mixture for 3.5 min at room temperature and then washed rapidly with water showed by ninhydrin assay 249 nmoles of EDA coupled per mg of membrane. An unsupported membrane similarly treated showed 153 n moles EDA/mg membrane.

Accordingly, coagulated and unsupported membranes commonly showed by ninhydrin 150-200 n moles EDA/mg.

Another route to useful hydrophilic polymer surfaces, microfilters, ultrafilters and the like is via the cyanoethylation reaction which yields beta-substituted propionitrile derivatives. A typical reaction is that of acrylonitrile with a hydroxy compound to form s-alkoxypropionitriles in accordance with the following reaction:

$ROH + CH_2:CHCN = ROCH_2CH_2CN$

This reaction has been employed for the conversion of low molecular weight compounds and also macromolecular substances including cellulose. An excellent review is to be found in the Encyclopedia of Polymer Science and Technology, Volume 4, Page 333, written by N. M. Bikales. We have found that the surface cyanoethylation of insoluble film-forming polymers which contain the pendant alcohol group or which can be hydrolyzed to a polymeric alcohol such as cellulose acetate can be accomplished by the cyanoethylation reaction catalyzed by base. Then the pendant propionitrile on the surface can via the Payne or similar reaction be converted to the corresponding amide. The process is of particular utility for the purpose of imparting hydrophilicity. The 2-cyanoethoxy group is readily converted by the Payne reaction into the corresponding amide.

The technology for the conversion of cellulose is well established and is appropriately described in the article of Bikales cited above. A number of publications and patents cited in this article, particularly those by Bikales, are highly instructive as to the various means for effecting the cyanoethylation of cellulose, as an example.

Cellulose acetate is an excellent film-forming polymer which has been commonly used to make membranes of the ultrafiltration and reverse osmosis types. In the Case of ultrafiltration membranes, the conversion of the surface ester groups to the corresponding alcohols has been achieved by technologies which are well known, including the use of aqueous buffers of approximately PH 10, dilute solutions of sodium hydroxide, and the like. For the purposes of this invention, it is advantageous to convert only the surface hydroxide groups, those which are fortunately the first to be so converted, while retaining the hydrophobicity and chemical properties of the base cellulose acetate polymer.

In the case of cellulose acetate reverse osmosis membranes, the process has applicability also because the superficial treatment of the membrane surface by the cyanoethylation reaction in turn followed by the Payne or similar reaction produces a surface having a high concentration of amide groups of a high and desirable degree of surface hydrophilicity.

The cyanoethylation reaction can be applied to any polymer surface which contains a group which can be readily cyanoethylated. Polymers of cellulose acetate, vinyl acetate and insolubilized films of polyvinyl alcohol are readily treated by the cyanoethylation reaction.

Another, different means of converting a usually hydrophobic polymer to one having a surface which is hydrophilic by virtue of the amide group is by the surface treatment of polymeric esters where the pendant ester group is joined to the polymer backbone via a carbon-carbon link, such as in polymethylmethacrylate and polymethylacrylate by direct treatment with concentrated ammonia. Reactions of these kinds are well described in standard textbooks such as in Vogel's *Textbook of Practical Organic Chemistry*, Longman, London and New York (1978), Fourth Edition. Section III, p 155 describes various reactions to form the amide. However, ones which are useful for the purposes of this invention are those which allow a preformed polymer to be surface treated by reactions which do not alter the basic polymer structure and are readily carried out under industrial conditions. A suitable example in Vogel is a conversion of dimethyl succinate with concentrated aqueous ammonia to the corresponding succinamide at high yields at room temperature. We have found that the same reaction proceeds with polymers such as polymethylacrylate and polymethylmethacrylate, as examples, employing 30% aqueous ammonia. When performed at room temperature, the reaction is quite slow, requiring about s days even with coagulated surfaces. It is even slower with smooth surfaces, requiring treatment of about 4-7 days at room temperature. Reactions at higher temperatures and higher concentrations of ammonia presumably proceed more rapidly. Thus, a wide variety of polymers containing the pendant ester group attached to the backbone by a carbon-carbon bond are also susceptible to conversion to the corresponding amide.

Once a nitrile-containing polymer has been surface-treated to form the amide according to the teaching of these inventions, it can be subsequently converted to a number of other useful derivatives. For example, a surface amide group treated with hydrazine forms the hydrazide which with nitrous acid forms the hydrazonium cationic species, one capable of reacting with amines such as the amino group of a protein to effect coupling. Those hydrophilization coupling reactions which use a limited amount of hydrazine to effect coupling allows for the retention of a hydrophilic microenviroment for the bipolymer. The use of a controlled number of points of attachment of a protein or enzyme to the surface can also be effected, producing a system favorable for enzymatic reactions or those employed in affinity processes.

Many other useful applications can result from the teachings of this invention on the selective conversion of surface nitrile groups into amides. Since amides have a high reactivity with certain dyes, dye acceptibility can be influenced in a favorable manner. Also, adhesion to the polymer surfaces can be increased strongly by this reaction. Chemical crosslinking to the surface can also be effected by the use of a diol or polyol on one hand or a diamine or polyamine on the other, either with or without a suitable catalyst to effect a transesterification or transamidation reactions as taught in the patent of Gregor et. al. and the co-pending CIP application listed above.

Further, by using known reactions one can convert the surface sulfonic acid, amino, quaternary ammonium or other desirable moieties to effect a desirable surface hydrophilicity, charge or susceptibility for coupling or crosslinking to other substances as taught in the Gregor patent and co-pending CIP application specified above. For example, the derivatization of amide groups on surfaces of filters and membranes allows a wide range of functional groups to be attached. Typical, applicable procedures for derivatization are described, for example, by Inman and Dintzis (Biochem. 8 No. 10, October 1969, p. 4074). The preparation of the EDA derivative was described, similar to the one employed in this invention. Also, the the hydrazide form of cross-linked polyacrylamide beads were prepared, then converted into the hydrazonium form by treatment with nitrous acid, and this acyl azide was useful for coupling to proteins and other substances containing the amino group. The hydrazide derivative of the hydrophilized PAN membranes can be similarly prepared. The diethylaminoethyl and trimethylammonium derivatives were also prepared by Inman and Dintzis. Similarly, the sulfoethyl derivative was prepared by the general acyl azide method wherein the coupling agent was taurine or one of its analogs.

As was pointed out earlier, the surface treatment of nitrile-containing polymers requires longer periods of time when the surface is smooth and less when it is rough on a molecular level. It is well known from the use of SEM (scanning electron microscope) techniques that coagulated membranes have an extensive and porous surface, where it can be assumed that the surface nitrile groups are much more exposed than is the case when a film of polymer solution is allowed to dry or is formed from a melt, etc. Certain treatments as those with sulfuric acid, being much stronger, were able to convert smooth surfaces. The more gentle treatment afforded by the use of hydrogen peroxide required longer periods of time with smooth surfaces. However, in all cases extending the period of treatment allows one, for the most part, to impart to a smooth surface the same degree of hydrophilicity as that imparted to a coagulated surface.

A useful procedure for the treatment of a smooth polymer surface to make it rough superficially is by the use of a brief exposure to a swelling solvent followed by coagulation. This does not disturb the body of the polymer which retains its high mechanical strength. Smooth PAN films treated by a rapid wash with warm or hot DMF followed by coagulation with a non-solvent such as water makes the surface rough on a molecular level. Then it can readily be treated to make it hydrophilic.

The advantage to this procedure are manifold. In many cases, strong microfilters can be made of woven or non-woven fibers of a nitrile-containing polymer such as PAN. Or, an existing fiber of olefinic or polyester nature can be surface treated with a solution of PAN, which is then coagulated and rendered hydrophilic. Or, the surface coating of PAN can be allowed to dry fully, and then a rapid wash with solvent followed by coagulation renders the surface capable of rapid hydrophilization. Often, in dealing with fouling constituents of particulate nature it is desirable to have a screen or microfilter having a high degree of mechanical strength and rigidity, and also non-fouling in nature. Such surfaces can be made by the teachings of the former Gregor patent and application referred to earlier, or by the procedures just described. The choice of which procedure to employ is dictated by the specific application desired.

Also, microfilters and ultrafilters which do not adsorb proteins are highly desirable, particularly in biotechnology applications. To make a material which does not adsorb valuable proteins, one starts with a matrix or support material of a spun-bonded nitrile-containing polymers such as PAN. This then can be surface-coagulated and rendered hydrophilic as described in the teachings of this invention. Then a PAN membrane can be cast on top of this to form the usual supported membrane, which after coagulation, and final surface treatment makes an entirely hydrophilic system. Where proteins are to be separated, as an example, a non-denaturing support material may be desirable.

The microfilters and membranes of this invention can be employed in many different ways. First, they can be used under cross-flow or backwash conditions to separate suspended solids on the basis of size and also to remove them from a solution of proteins, and also to separate proteins as will be described later. The ordinary conditions of cross-flow are useful and many commercial devices exist to effect this. However, the hydrodynamic conditions which obtain are not optimal because the degree of convection at the surface is much lower than that at a distance removed from the surface. For many applications an optimal mechanical system is that where the microfilter or UF membrane is mounted on one or both of the surfaces of a spinning cylinder contained within an annulus, where the feed solution is passed through the annular space and a pressure imposed on it. Devices of this kind are well known, the principles of which were first elucidated by and describes as Taylor vortices in 1923.

The spinning device minimizes concentration polarization and the clogging of surfaces by suspended solids particles held there by permeate flow, and offers many advantages. The combination of a hydrophilic microfilter or ultrafilter together with the spinning principle represents a major improvement in the general techniques of microfiltration or ultrafiltration. For example, ordinary hydrophobic membranes can be used to remove suspended solids from a fouling solution such as corn stillages or the light steep waters which originate from fermentation or corn wet milling processes. These feeds can be microfiltered or ultrafiltered only by the imposition of a high torque applied to the cylinder. Where the cylinder has a diameter of 1½ inches, angular velocities of the order of 3,000 RPM are required. On the other hand, when hydrophilic microfilters or membranes are employed, a high rate of permeate removal can be effected at a rotational velocity of only 300–500 RPM. It is evident that a non-fouling surface combined with the spinning principle are required to make for major improvements. The same principles apply to the separation of proteins, where concentration polarization is severe because of the slow rate of diffusion of proteins away from a membrane surface where they are not denatured.

The teachings of this invention apply also to stationary phases employed in chromatography for both analytical and preparative purposes. Many stationary phase configurations are evident to those skilled in the art. A typical system would result from the casting of a porous nitrile-containing polymer such as PAN onto a solid surface which has been corrugated so as to produce ridges having a thickness of a few microns in the final cast film. The casting surface could be a grooved glass plate made by exposing thin lines on a parafin-coated glass plate, followed by treatment with an etching solution of hydroflouric acid or its salts to form grooves 2–3 microns deep. The polymer solution is cast upon this plate and coagulated in the usual manner. Its porosity is controlled by the use of techniques and procedures well known to those skilled in the art. Then the cast film is rendered hydrophilic. The sheet is then wound onto a rod and then encased in a cylinder. The feed solution is passed through the annular space to comprise the moveable phase, and the stationary phase is the porous, hydrophilic polymer phase. Since films having a thickness of but a few microns can be made in this manner, the chromatographic systems which result have a high capacity with a large number of plates and high resolving power because the diffusional path is so small. These systems have obvious and manifold advantages over the usual chromatographic columns made of fine, packed beads.

By employing good film-forming polymers containing the nitrile group (such as PAN), one can control the pore spectrum of membranes using the familiar teachings of Elford. One first casts a film of polymer solution in a high viscosity solvent and allows it to dry completely. Then the film is swollen in a mixture of solvent and non-solvent. Mixtures of DMF with water, alcohols or ketones or other partial swelling mixtures are employed to advantage. When the proper degree of swelling has been achieved, the film is coagulated in a non-solvent such as water. Experience has shown that these films are more homoporous than those that are coagulated directly from a good solvent such as DMF. These teachings are directly applicable to the making of the membranes and microfilters of this invention.

Improved reverse osmosis membranes can also be prepared employing the teachings of this invention. The prior inventions of Cadotte as typified in his U.S. Pat. No. 4,259,183 (Mar. 31, 1981) teach the preparation of composite membranes by the reaction of water containing reactive aliphatic amines on the surface of an ulfiltration membrane with heptane containing a di- or trifunctional acid chloride or similar substance which forms a very thin polymer film at the interface, one effective for purposes of desalination. The preparation of reverse osmosis (RO) membranes by this technique is made difficult and the final product may not be sturdy because of the difficulties in wetting a hydrophobic ultrafiltration membrane with an aqueous amine solution and a possible delamination of the ultrathin membrane from the support membrane surface on use.

The teachings of this invention allow for the direct chemical coupling of a polyfunctional amine to the hydrophilic amide-containing surface such that after cross-linking the entire composite membrane is effectively cross-linked throughout. Membranes of superior RO properties and stability are the result.

The teachings of this invention allow for many different reactions to be carried out. First, the membrane can be converted by treatment with EDA or hydrazine to form the corresponding derivative, and then treated with a polyfunctional amine or a mixture of such substances to couple to the surface the amine moiety. Following this, treatment with the acid chloride cross-linking substance (dissolved in a water-immiscible solvent) produces the RO membrane.

A wide range of polyamines of the kind used by Cadotte can be employed, including polyethyleneimine (PEI) of varying molecular weights, also dimethylpiperazine (DMP) and the like. The cross-linking agents which can be employed include 0.5% solutions in either hexane or heptane of m-tolylene 274 diisocynate (TDI) and also trimesoyl chloride (TMC), among others. The membranes prepared in this manner show a high rejection to salts, a good flux and salt rejection at both ambient and elevated temperatures.

A demonstration of the non-fouling properties of a given material presents problems because there are no standard solutions or suspensions for this purpose. We have found that the best standard from many points of view is a solution of a readily obtainable protein at a pH hear the point of use and not too far from the isoelectric point. Bovine serum albumin (BSA), readily obtained at a high purity and at a reasonable cost, serves very well for this purpose. In the case of ultrafiltration membranes which have pores usually not very much larger than the diameter of the protein in solution, the occurrence of protein denaturation and membrane fouling is readily demonstrated by a loss in hydraulic permeability when the membrane is subjected to a protein solution feed, following which the buffer or pure water is used as a feed. If the hydraulic flux returns to its original water or buffer value, this constitutes excellent evidence of non-fouling. Longer exposures of the membrane to a protein solution usually accentuates the effects observed by a larger decrease in feed flux and the subsequent flux of water of buffer is very much lower than its value before exposure of the membrane to protein. As a rule, once a membrane has been coated with denatured protein, the flux regains its original value only after prolonged and harsh chemical treatment, or the use of a proteolytic enzyme to hydrolyze the proteins. A specific test for nonfouling is described later.

The invention will be further described with reference to the accompanying drawings wherein.

Definitive tests showing the unique properties of the converted PAN core membranes which are one subject of this invention were made by employing a thin-channel recirculation UF cell. Model TCF2, made by the Amicon corporation was employed. The channels were 0.25 mm high and the cell was used at a pressure of 50 psig with a recirculation rate up to 157 ml/min, corresponding to a Reynolds number of 760.

Three different proteins were separated by UF in mixtures of two of each. These included IgG of MW 153,000 with a Stokes radius of 5.4 nm (manometers). The Stokes-Einstein relates the diffusion coefficient of the protein, the viscosity of the solution and other constants to the effective protein radius r. For BSA of MW 66,300, r is 3.6 nm, and for lysozyme of MW 14,400, r is 1.9 nm.

The feed volumes of these experiments were 100 ml of solution containing 1.0 mg/ml of mixed proteins BSA and IgG in a 1:1 weight ratio dissolved in 0.05M sodium phosphate, 0.15M sodium chloride and 0.02% (weight-/volume) of sodium azide solution buffered at pH 7.0. The membranes used had a diameter of 43 mm and the recirculation rate of feed was 54 ml/min, corresponding to a fairly high rate of cross-flow.

Figure 1:
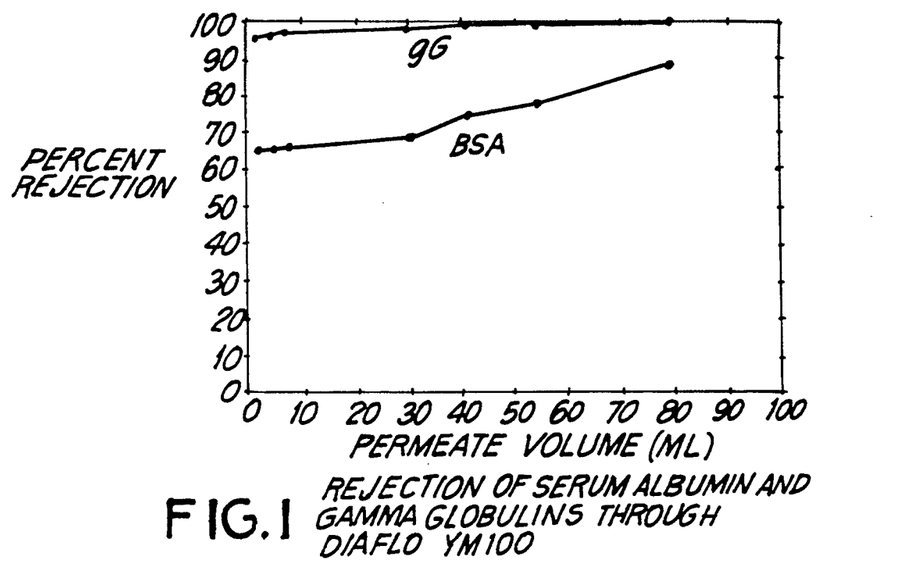
FIGS. 1 and 2 show the rejection of a mixture of BSA and gamma globulins by two membrane types.
Figure 2:
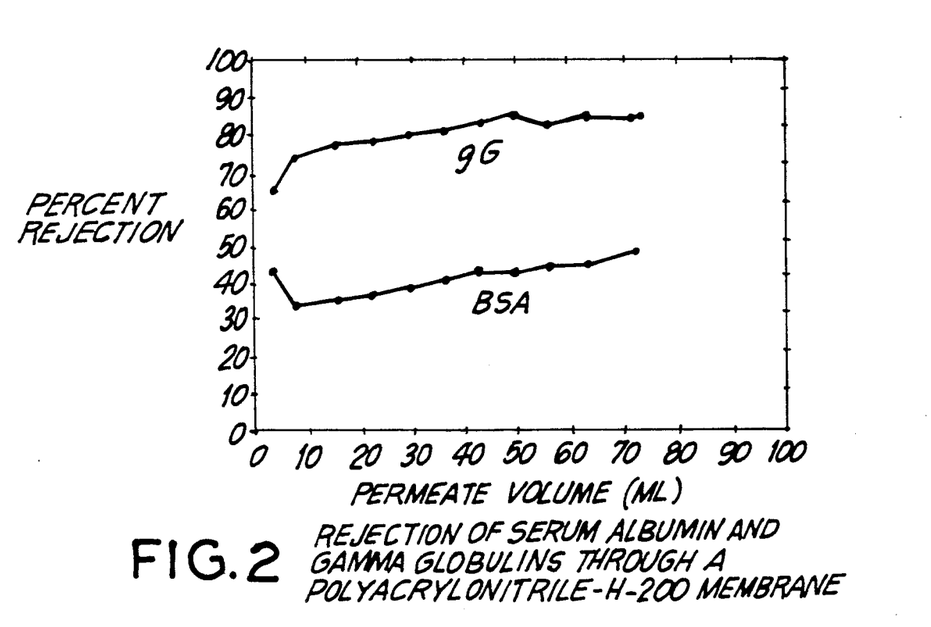

The membranes of this invention were compared to the commercial Disflow YM100 membranes of Amicon Inc., found to be the best of a wide range of commercially available membranes for the purpose. The permeate flux through the membranes after 48 minutes was 3.4 and 1.5 ml/min for the Diaflow and the hydrophilic membrane of this invention, respectively. FIGS. 1 and 2 show the percent rejection of each protein as a function of permeate volume for the two membranes. Since one protein had been radiolabeled and could be assayed directly, using also a total protein assay, the flux of each protein could be determined and its rejection calculated. FIGS. 1 and 2 show that the protein rejection ratio with the Disflow XM100 membrane was approximately 1.8 initially and after about 70 ml had passed, it fell to 1.3. For the hydrophilic membrane, the rejection ratio after about ten minutes was approximately 2.1 and at about 70 minutes it was 1.8. While these proteins have molecular weights in the approximate ratio of 2:1, their separation is not sharp because there is evidence that the two proteins are loosely bound in solution. The addition of certain reagents which can decrease this binding is well known, but was not employed here. The buffer fluxes of the membranes before being subjected to protein solutions were measured, and after contact with proteins were again measured. With the hydrophilic membrane it was equal to or greater than 99.9%; the Diaflow membrane recovered only 83% of its flux, considerably better than most of the commercial membranes which recovered from 10–30%. As was noted earlier, prolonged treatment with protein usually lowers water flux recoveries where protein denaturation exists.

The flux and individual protein rejections of a 1:1 (weight) mixture of BSA and lysozyme in the same buffer were also measured under the same conditions. A comparison was made between a hydrophilic membrane made by the procedures of this invention and the best of the commercially available membranes, PM30 of Amicon. The permeate flux here after 48 minutes was-s ml/min for PM30 and for the hydrophilic membrane was 2 ml/min.

Figure 3:
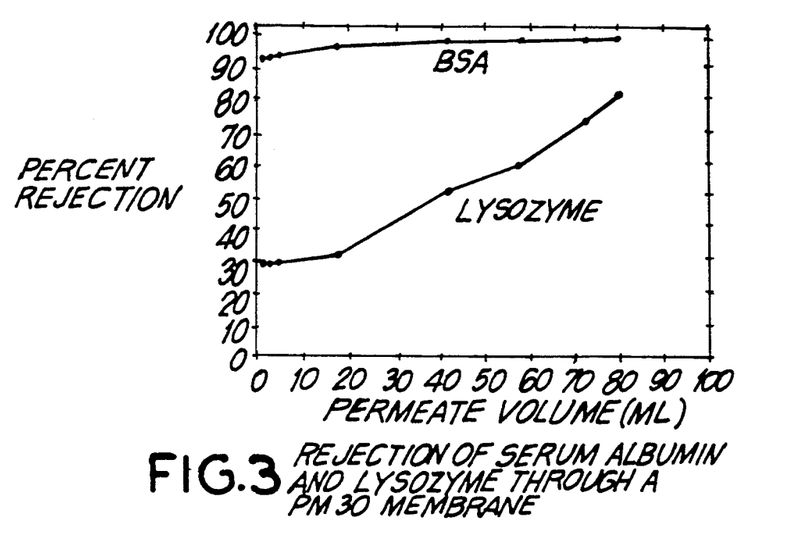
FIGS. 3 and 4 show the rejection of a mixture of BSA and lysozyme by two membrane types.
Figure 4:
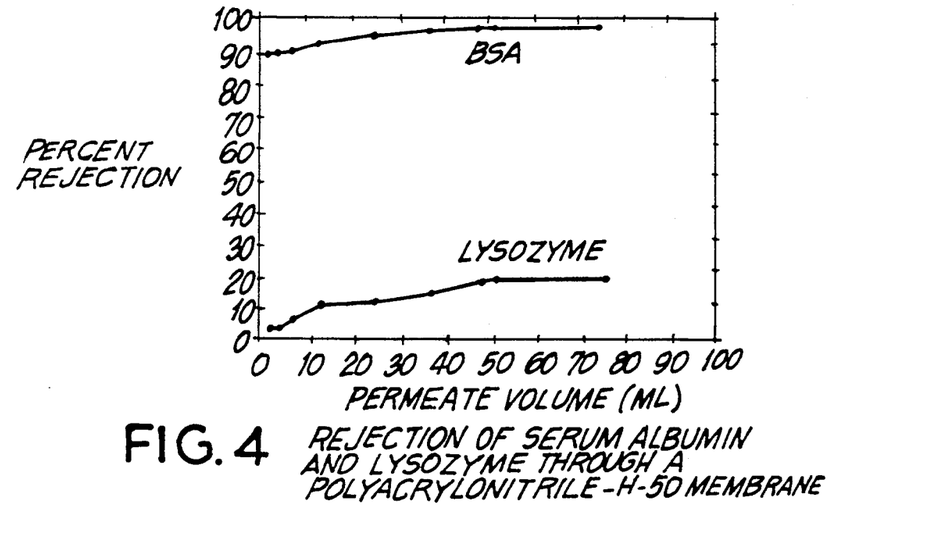

FIGS. 3 and 4 show the percent rejection for this pair of proteins by the PM30 and hydrophilic membranes, respectively. The commercial membrane showed an initial separation factor of 3.3 which fell to 1.4 when 70 ml had passed. Thus, it lost the ability to discriminate between the two proteins sharply even after a limited period of time. The hydrophilic membrane showed an initial factor of 23 and after 73 ml had passed it was 6.5, so it retained its substantial rejection properties. The loss in rejection with the passage of permeate in the latter case was due in large measure to the shift in feed composition in favor of the larger protein, making relative rejections smaller and independent of the membrane fouling process which was evidently responsible for the sharp rejection loss observed with the commercial membrane.

Figure 5:
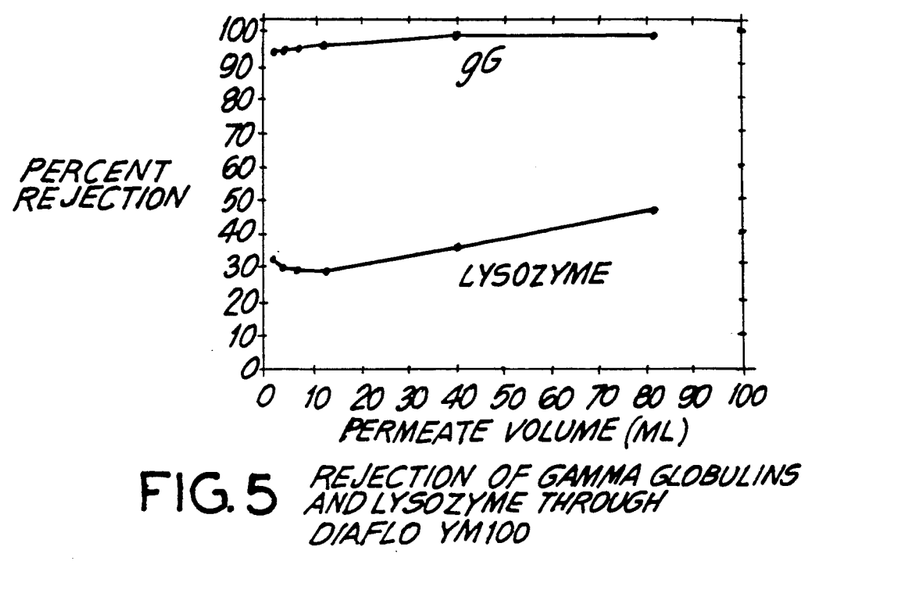
FIGS. 5 and 6 show the rejection of a mixture of gamma globulins and lysozyme by two membrane types.
Figure 6:
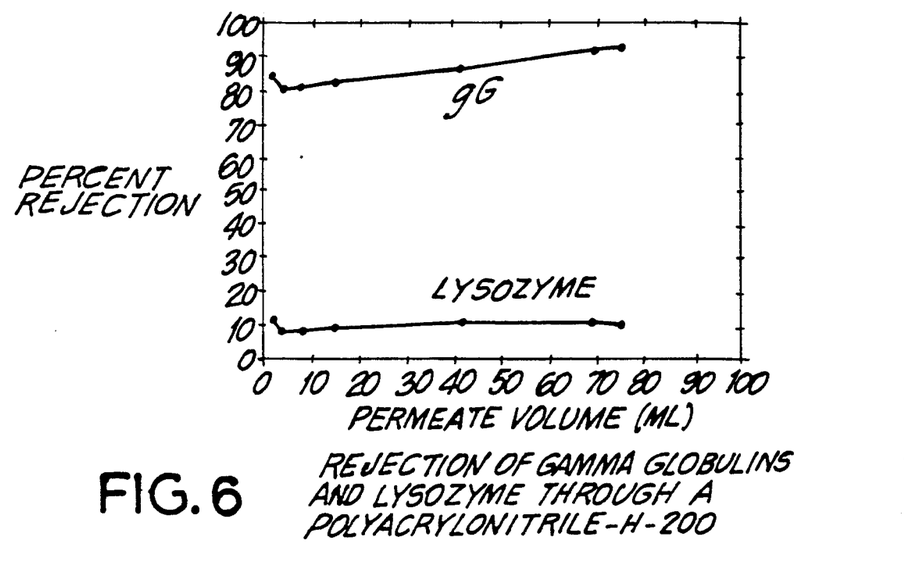

A comparable comparison was made for IgG and lysozyme, in this case with Diaflow YM100 and one made by the surface treatment of this invention. The separation factor between the two proteins was larger, as expected. With the commercial membrane it was 2.9 initially and 2.4 later; with the hydrophilic membrane the values were 8.5 and 9.2, separation factors which were substantially larger, hardly changing with the passage of permeate (FIGS. 5 and 6).

Under conditions of a high cross-flow, protein separations are reduced by concentration polarization. Using the spinning cell described earlier, it is anticipated that the greater convection obtainable wi.11 make for a substantially lower degree of polarization and a greater degree of separation with non-denaturing proteins.

It should also be pointed out that the hydrophilic membranes employed in the protein separation studies of FIGS. 1–6 were not made to be homoporous; the use of these procedures would probably increase separation factors.

The general procedures for the making of membranes of a desired porosity and a degree of hydrophilicity can be given, but the specific parameters of the procedure depend upon the kind and molecular weight of the polymer, the casting solvent, the percent solids of the polymer in the casting solution and the details of the hydrophilization reactions.

In general, for a given polymer casting solution the increase in the percent solids makes for a lower pore diameter, other things being equal. For example, casting PAN of MW 150,000 dissolved in DMF at room temperature and coagulating in ice water using a 12% casting solution with a gate opening of 7 mils onto Hollytex support produced a membrane with a flux of 50 μsa (microns/sec-atm). With 11% polymer, 100 μsa membranes were made, 9% yielded 150 μsa and 7% yielded 200 μsa. When these were hydrophilized for one-half hour in 1% peroxide solution as described above, corresponding fluxes were 60, 85, 110 and 250.

One can estimate average pore diameters on the basis of hydraulic permeabilities in a very crude manner, or one can employ solutions of a test polymer such as Dextran of different molecular weights and employ high pressure liquid chromotography procedures to obtain rather reliable pore size distributions as described by Kassotis et. al., J. Memb. Sci. 22, 61 (1985).

To determine the most desirable extent of chemical treatment to impart optimum hydrophilicity to a membrane surface is also performed in an empirical manner. We have found that immersing PAN membranes into solutions of an appropriate peroxide concentration for periods of time ranging from the point where they became wettable (as shown by the non-formation of droplets of water on the surface) to periods where the hydraulic permeability increased significantly are appropriate. More surface amide groups are formed with treatment time, as shown by ninhydrin analyses. The critical test is that of usage. The ability of a membrane to ultrafilter a protein solution and then, when buffer or pure water is replaced, to return to its original hydraulic permeability is an extremely simple and highly informative test. The test of functionality is both reliable and highly practical.

Other kinds of useful hydrophilic membranes containing the pendant amide group were also prepared. Membranes were cast from a 10% solution in DMF of cellulose acetate of acetyl number 39.4 (Eastman) employing a doctor blade opening of seven mils and cast onto a Hollytex 3392 (Eaton-Dikeman) support. Immediately after casting the membranes coagulated in ice-water to form ultrafiltration membranes. After washing to remove solvent, some were treated by immersion in 2% sodium hydroxide at room temperature. One minute of immersion rendered the material partially hydrophilic; periods ranging from two to approximately thirteen minutes rendered the films hydrophilic, as shown by water-wetting. With longer treatment, swelling of the polymer was observed, indicating that conversion of groups below the surface had been accomplished. It should be noted that hydrophilicity as indicated by a surface strongly wetted with water is not of itself indicative of the high degree of hydrophilicity resulting from the presence of a high content of amide groups on the surface.

Membranes were then cyanoethylated in the following manner. Two different cyanoethylation baths were prepared, one 90% (by volume) of 2% sodium hydroxide and 10% of acrylonitrile monomer, referred to hereafter as 90% base. The other was 90% (by volume) of acrylonitrile monomer and 10% of a 2% solution of sodium hydroxide in water, referred to as 90% nitrile. For the cyanoethylation reactions, a series of identical coagulated cellulose acetate membranes were used. Samples A and B had been treated for ten minutes in 2% sodium hydroxide at room temperature. Sample A was immersed for 20 min at 55° C. in the 90% base solution, and sample B in the 90% nitrile solution, under the same conditions.

Sample C was not treated first in base but immersed directly for 20 min in the 90% nitrile solution and sample D was a similar sample immersed directly into the 90% base solution. Finally, sample E was immersed for three minutes at room temperature in 2% sodium hydroxide, then dipped into the 90% nitrile solution for three minutes at 50° C.

After washing with water, each membrane was then treated in the Payne buffer containing fumeric acid and 5% hydrogen peroxide at 55° C. for twenty minutes. Samples A and B were rendered highly hydrophilic but there was some sub-surface blistering at the support material—membrane junction. Samples C and D were also strongly hydrophilic but were not blistered. Sample E was also strongly hydrophilic and exhibited some blistering. By the employment of these reactions, a high degree of surface hydrophilicity Was imparted.

For the conversion of a polyester derived from a polymeric acid into the corresponding amide, two polymers were employed. A 20% solution of polymethylacrylate in ethylacetate (Monomer-Polymer and Dajac Laboratories, Inc.) was employed, as was a 20% solution of polymethylmethacrylate, molding grade V920 (Rohm and Haas) in DMF. Both solutions had an appropriate viscosity for casting. First, sheets of the first two polymers were made by casting the solution onto a glass plate, allowing it to dry completely and then removing it in water. The UF membranes were also cast employing a seven mil gate opening on the doctor blade and cast onto Hollytex 3392 (Eaton-Dikeman). Following casting, the polymethylacrylate film was coagulated in methanol, the polymethylmethacrylate film in water.

All films and membranes were then treated with 30% ammonia in water at room temperature. The smooth polymer surfaces, even after four days of contact under these conditions in closed containers showed no evidence of surface hydrophilicity. On the other hand, after 72 hours of treatment the coagulated membranes were hydrophilic.

The specifications and test procedures applicable to the subjects of this invention and which define its limitations are now presented. These procedures distinguish the subjects of this invention from other products which may have certain, similar functionalities but not all of the desirable properties of the subjects of this invention.

The first test differentiates between swelling structures and non-swelling ones. For example, it differentiates between the strongly hydrophilic but substantially non-swelling materials produced by the teaching of this invention from ones which are similar in having pendant amide surface groups but which are water-swollen gels. In particular, it distinguishes between the membranes of Example 1 of this application from those made using the teachings of Example 19 of the Gregor patent, U.S. Pat. No. 4,596,858. The material of Example 1 has pendant amide groups on the surface of a water-insoluble polymer which is hydrophobic but substantially non-swelling in water. Materials made from Example 19 are cross-linked, strongly hydrophilic gels which swell to have in the swollen state water contents ranging from about 50–80% (by weight) or weight swelling indices (wet weight divided by dry weight) of 2 to 5. Both materials expose a highly hydrophilic surface to the ambient solution, neither denatures proteins (as an example) when a sufficiency of amide groups are on the surface, and both show a positive test for amide groups.

There are substantial advantages to the non-swelling structures of the subject invention. These retain the mechanical strength and structural stability of the non-swelling base or core polymer. A core polymer, such as PAM, can be cast (for example) in the form of substantially water impermeable films which are then treated to render their surfaces strongly hydrophilic. Further, a wide range of materials can be coated with the hydrophobic and stable polymer PAN, as an example, and then be surface-treated and rendered hydrophilic. Also, membranes made using a PAN core polymer can be cast, coagulated and then surface treated in accordance with the teachings of this invention to make materials of a higher mechanical strength and rigidity than can be achieved by the water-swollen, gel-type membranes. Thus, they possess superior properties for many applications.

The differentiation of swelling versus non-swelling structures can be made as follows. An unsupported UF membrane of PAN is made in accordance with Example 1 but the casting solution is applied not to a polyester support but directly onto a solid surface such as a glass plate of the type commonly used in hand-casting. After casting the film is coagulated in water and hydrolized as described in Example 1.

Only unsupported membranes can be tested because support materials can hold large and differing amounts of water. This test cannot be applied to coated or treated solid objects such as treated surfaces or microfilters because the hydrophilic portion constitutes a small fraction of its total weight or volume. It also must be applied to membranes which have been dried in air (at room temperature for 24 hours) or in a 60° C. oven for 4 hours after being fully prepared. This serves to allow this test to be applied to membranes made using a base polymer which shrinks irreversibly on drying, as when cellulose acetate is used as the core polymer.

A UF membrane made in accordance with Example 19 was similarly prepared from a 5% solution of PAM (polyacrylamide) of 5,000,000 MW in water to which had been added 50 mole % glycerol. The membrane was cast at a blade opening of 8 mils onto glass, dried at 90° C. for 2 hours and then cured for s hours at 140° C. Its water flux was 340 microns/sec at 45 psi.

For the volumetric swelling (VS) test, the sample previously prepared and dried and then swollen for one day in water is removed from water, blotted quickly with filter paper to remove surface water, and its wet volume measured rapidly using a ruler for the area and a thickness gauge accurate to +2 microns. Then the membrane is dried at 60° C. for four hours while held flat between porous (filter paper) materials, and then its dry volume is determined. The VS index is defined as the wet volume divided by the dry volume. For the membranes which are made by the instant teachings, the VS index varies from 1.0 to 1.3. In the case of the gel-type membranes of the prior art, the VS index varies from 1.8 to about 5. Accordingly, substantial and significant differences between the volume swelling indices are observed.

This volumetric swelling test is unequivocal unless it is applied to polymer blend membranes similar to those of Example 34 of the Gregor patent, when employing PAM along with a water-insoluble, film-forming polymer such as PAN or Kynar. In those cases the VS index of a coagulated or non-coagulated membrane will vary between 1.2 and 2. Experience has shown, however, that such polymer blend membranes do not possess the strongly hydrophilic character which meets the non-denaturation specifications also called for herein.

A highly definitive and simple test for the non-denaturation of proteins at a surface is performed using a supported or unsupported UF membrane of appropriate average pore diameter, measuring its hydraulic permeability to a given buffer, then ultrafiltering a standard protein solution for a prescribed period of time, measuring protein rejection and flux, then rinsing the cell with buffer and re-measuring the hydraulic permeability regain of the membrane in buffer. It is required that the hydraulic permeability of the membrane be high enough so it is readily measured in standard, low pressure equipment. At the same time it must not be too high in that its pore diameters are quite large compared to the effective diameter of the protein molecules in solution. In the latter case, the coating of the pore surfaces by denatured protein could be so thin as to constitute a small fraction of the pore diameter so the change in hydraulic permeability is not significant. When membrane pore diameters are not too large compared to the size of the protein molecules, a skin of insoluble, denatured protein is formed and substantially reduces the flux of buffer.

There are many tests for average pore diameters. The recent publication by Kassotis referred to earlier is a sophisticated one which yields reliable values. However, for the purpose of selecting porous membranes to show the presence or absence of protein fouling, it suffices if in the UF of the protein solution, the rejection of protein after five minutes of exposure is at least 0.1 or 10%. A typical assay procedure is the absorbance measurement at 280 nm. Rejection is defined as the difference between feed and permeate concentrations, divided by the feed concentration, expressed as a fraction or a percent. Under these circumstances the membrane has a pore diameter which is appropriate for the purposes of this test.

These tests can be carried out with a wide variety of UF cells. A magnetically driven stirred cell such as model 8050, Amicon or the Pellicon cell of Millipore are typical examples.

The test protein is bovine serum albumin (BSA), A 8022, Sigma Chemical Company. The buffer is prepared to be 0.05 M in sodium hydrogen phosphate, 0.15 M in sodium chloride, 0.02% in sodium azide and at pH 7.0. Protein concentrations of 1 mg/ml are convenient to use. All water used is demineralized and then passed through a 0.22 micron membrane filter of commerce. Prior to UF procedures, the membrane is well soaked in deionized water. Before the test, about 50 ml of water followed by 50 ml of buffer are passed through the membrane. For the purposes of the test, constant pressures ranging from 5 to 50 psi are employed, dictated by the hydraulic permeability of the membrane.

The test is performed by first passing buffer through the membrane at a specified pressure, determining the hydraulic permeability. Following this, the buffer is replaced with a protein solution which is ultrafiltered for a period of 1 hour. If the membrane has too high a flux, a lower pressure is used because it is important to maintain the ultrafiltration of protein for that period of time, additional samples of protein-buffer solutions can be employed.

Following one hour of exposure, the cell is rinsed briefly with pure buffer and then buffer alone is ultrafiltered. As soon as a steady UF flux (5 min) is obtained, this value is taken and compared with the original UF flux of the "virgin" membrane. The flux regain must be at least 97% of the original buffer flux.

In selecting membranes for this test, it is important to insure the absence of pinholes or similar structural defects. For such purposes, subjecting the membrane to a 0.02% solution of blue dextran 2000 (Pharmacia Fine Chemicals) of average MW 2,000,000 can be employed following the protein test. The presence of a pinhole is shown by the presence of dye in the permeate.

This invention will now be described with reference to the following non-limiting examples.

EXAMPLES

Example 1

A PAN membrane was rendered hydrophilic by the following procedure. First, an ultrafiltration membrane was prepared by dissolving from 14 to 6% PAN of 150,000 MW in DMF, followed by filtering the solution hot to remove all traces of suspended solids. This casting solution Was applied to a polyester support (Hollytex 3329) at a knife-edge opening of 7 microns, following which the membrane was coagulated in water at 3-5° C. for several minutes, and then washed with water. A hydrophilization bath was prepared, 0.3 m in sodium fumarate, 0.025M in sodium borate, 0.1M in disodium EDTA and 1% or 0.3M in hydrogen peroxide. Enough sodium hydroxide was added to pH 9. This bath was warmed to 50°-55° C. The membranes were immersed in this bath for periods ranging from 30 minutes to 1.5 hours depending upon their desired properties. They were then washed with water and were ready for use. Membranes cast from 11% PAN showed by ninhydrin 180 n moles EDA/mg. The VS index was 1.1. Rejection to BSA was greater than 80% and flux regain was greater than 98%.

Example 2

A reverse osmosis membrane was prepared starting with a hydrophilized PAN membrane as described in Example 1. This was first converted to the hydrazine derivative by treatment for 60 min with 3M hydrazine in water, washed and followed by treatment with a 0.5% aqueous solution of a 16:1 mixture (by weight) of polyethylenimine (1200 MW) and dimethylpiperazine for 30 min. The excess amine solution was allowed to drain from the surface of the membrane, which was then dipped face-down in a 0.5% solution of hexane of a 9:1 (by weight) solution of m-tolylene 2,4 diisocyanate and trimesoyl chloride for 1-3 minutes. The membrane was then allowed to drain vertically in air for 15 min, then cured at 60° C. for 10 min, then cooled and washed with water. The membrane was then tested with a 3000 mg/ml solution of $MgSO_4$ at 400 psig. The flux was 40 gfd and the rejection of salt was 99% at 25° C. At 75° C. its flux was 30 gfd and its rejection was unchanged.

Example 3

A PAN membrane was cast from 11% solution and coagulated in accordance with Example 1. After washing with water, it was treated by a mixture of sulfuric and glacial acetic acids (50% by volume) by immersion in that solution for 3.5 minutes at room temperature, following which it Was washed rapidly with water to stop the reaction, with following rinses with water to remove traces of acid. It was then ready for use. By ninhydrin it showed 153 n moles EDA/mg. Its VS index was 1.1, its BSA rejection was greater than 50% and its flux regain was greater than 98%.

Example 4

A PAN film was prepared by spreading a solution of 14% PAN of MW 150,000 in DMF upon a glass plate, employing a gate opening so that the final film was about 20 microns thick. The film was allowed to air dry for four hours, then oven dryed at 60° C. overnight. When this film was subjected to the hydrophilization bath of Example 1, after four hours it was was slightly hydrophilic and only in certain areas. An identical, dry film was dipped into DMF at room temperature for three seconds, and then into ice water. Its superficial appearance did not change substantially. However, when this surface-coagulated film was treated with the hydrophilization bath of Example 1, after one hour it was strongly hydrophilic. By ninhydrin it showed 150 n moles EDA/mg.

Example 5

Hydrophilic UF membranes were prepared from cellulose acetate by the following procedure. A 10% solution of cellulose acetate (39.4% acetyl number, Eastman) was cast onto Hollytex 3392 using a doctor blade with an opening of 7 mils. The membrane was then immediately coagulated in ice-water, washed to remove solvent and then treated with either of two cyanoethylation baths, the first made by adding 90 volumes of 2% sodium hydroxyide to 10 volumes of acrylonitrile (referred to as 90% base), the second bath prepared by adding 90 volumes of acrylonitrile to 10 volumes of a 2% solution of sodium hydroxide, referred to as 90% nitrile. The coagulated UF membranes were then immersed into one or the other of the two baths at 55° C. for twenty minutes, and then washed with water. Following this, the membranes were treated by the hydrophilization bath of Example 1 except that 5% hydrogen peroxide was employed. The reaction was carried out for twenty minutes. Both membranes were rendered highly hydrophilic without any surface blistering. The film treated by 90% nitrile showed by ninhydrin 192 n moles EDA/mg, its BSA rejection was greater than 75%, its flux regain was greater then 98% and its VS index was 1.2.

Example 6

Cellulose acetate UF membranes were prepared as described in Example 5, with one series cast onto Hollytex and the other directly onto a glass plate (unsupported). All membranes were then immersed in 2% sodium hydroxide solution at room temperature for ten minutes and then washed with water. The samples were then cyanoethylated by a twenty minute immersion in one of the two cyanoethylation baths described in Example 5, then washed with water, and then hydrophilized as in Example 5. All membranes appeared to be highly hydrophilic. The ones which were cast onto the Hollytex support showed blisters which appeared to be at the junction between the support and the cast membrane. The unsupported membrane did not show comparable blistering. The sample treated by 90% base showed by ninhydrin 190 n moles BSA/mg, its VS index was 1.21 its rejection to BSA was greater than 80% and its flux regain greater than 98%.

Example 7

A reverse osmosis membrane was cast as described in Example 5 but instead of being coagulated at once it was allowed to dry at room temperature for four minutes with a slow movement of air across the surface of the membrane, following which it was coagulated. The surface film was annealed by immersion in water at 80° C. for an hour. Following this, the membrane was cyanoethylated by direct immersion into one or the other of the two cyanoethylation baths of Example 5, one predominantly nitrile and the other predominantly base. This reaction was allowed to proceed for two minutes at 50° C., following which the membrane was washed thoroughly with water at room temperature and then treated in the Payne buffer of Example 5 for twenty minutes at 55° C. The surface appeared highly hydrophilic. The low hydraulic permeability of the film was not affected by the post-surface treatment.

Example 8

An ultrafiltration membrane was prepared by casting a 20% solution of polymethylacrylate (Monomer-Polymer and Dajac Laboratories Inc.) in ethyl acetate onto a Hollytex support at a gate opening of seven mils. Immediately after casting, the film was coagulated in methanol at room temperature for thirty minutes and then washed with water to remove solvent. The film was then immersed in a 30% aqueous solution of ammonia at room temperature for 72 hours, following which the surface was strongly hydrophilic. Washing with water then rendered the membrane ready for use. By ninhydrin it showed 167 n moles EDA/mg, its VS index was 1.1, its rejection to BSA was greater than 80% and its flux regain greater than 98%.

What is claimed is:

1. A process comprising the following steps:
   (a) providing a solid insoluble non-swelling polymeric material comprising an interior portion and a surface portion and containing hydrophobic pendant nitrile groups on said surface portion; and
   (b) reacting the polymeric material with hydrogen peroxide in the presence of a reducing agent to convert a substantial fraction of said pendant nitrile groups to hydrophilic pendant amide groups.

2. A process comprising the following steps:
   (a) providing a solid insoluble non-swelling polymeric material comprising an interior portion and a surface portion and containing hydrophobic pendant esters groups on said surface portion;
   (b) reacting the polymeric material with a hydrolysis agent to convert said pendant ester groups to pendant alcohol groups; and then
   (c) reacting the polymeric material with a cyanoethylating agent in the presence of a base as catalyst to convert said pendant alcohol groups to pendant nitrile groups; and then
   (d) reacting the polymeric material with hydrogen peroxide in the presence of a reducing agent to convert a substantial portion of said pendant nitrile groups to hydrophilic pendant amide groups.

* * * * *